(12) United States Patent
Sharp

(10) Patent No.: US 6,694,471 B1
(45) Date of Patent: Feb. 17, 2004

(54) SYSTEM AND METHOD FOR PERIODIC RETRANSMISSION OF MESSAGES

(75) Inventor: Hascall H. Sharp, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 463 days.

(21) Appl. No.: 09/751,154

(22) Filed: Dec. 27, 2000

(51) Int. Cl.⁷ ................................................ H04L 1/18
(52) U.S. Cl. ..................... 714/749; 718/748; 709/224
(58) Field of Search ................................ 714/749, 748; 400/82; 455/18; 709/224

(56) References Cited

U.S. PATENT DOCUMENTS

| | | | | |
|---|---|---|---|---|
| 4,882,765 A | * | 11/1989 | Maxwell et al. | 455/18 |
| 5,265,103 A | * | 11/1993 | Brightwell | 714/748 |
| 5,833,375 A | * | 11/1998 | Gauthier et al. | 400/82 |
| 5,951,706 A | * | 9/1999 | Benner | 714/749 |
| 6,023,507 A | * | 2/2000 | Wookey | 709/224 |

OTHER PUBLICATIONS

R.R. Stewart, et al; "Stream Control Transmission Protocol;" http://www.ietf.org/internet-drafts-draft-ietf-sigtran-sctp-13.txt, Jul. 11, 2000.

L. Coene, et al.; "Signalling Transport over SCTP Applicability Statement;" http://www.ietf.org/internet-drafts-draft-ietf-sigtran-signalling-over-sctp-applic-00.txt, Jul. 18, 2000.

L. Coene, et al.; "Stream Control Transmission Protocol Applicability Statement;" http://www.ietf.org/internet-drafts-draft-ietf-sigtran-sctp-applicability-01.txt, Jul. 18, 2000.

International Telecommunication Union; "ITU-T Recommendation H.323-Annex E;" all, May 1999.

International Telecommunication Union; "ITU-T Recommendation Q.2111;" all, Dec. 1999.

* cited by examiner

Primary Examiner—Albert Decady
Assistant Examiner—Dipakkumar Gandhi
(74) Attorney, Agent, or Firm—Baker Botts L.L.P.

(57) ABSTRACT

A method for retransmission of messages includes transmitting a first message from a source to a destination using a packet-based network. The destination is capable of transmitting an acknowledgement to the source indicating the receipt of the first message. The method also includes determining that the first message has not been acknowledged and periodically retransmitting the first message from the source to the destination. In doing so, the first message is bundled in a packet with a second message that is being transmitted from the source for the first time. Therefore, an additional packet is not created for the retransmission of the first message.

28 Claims, 4 Drawing Sheets

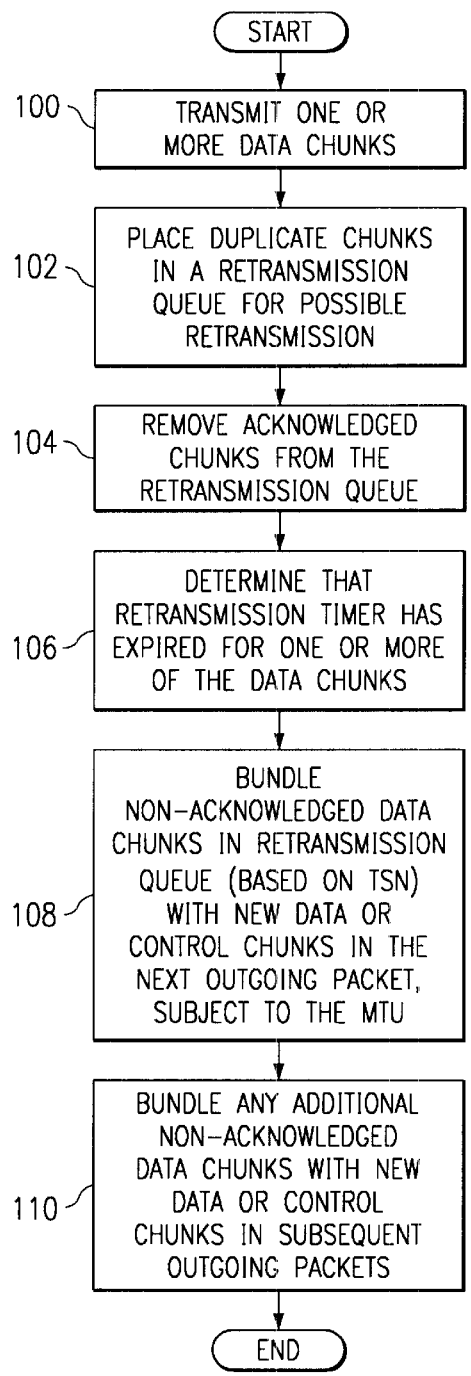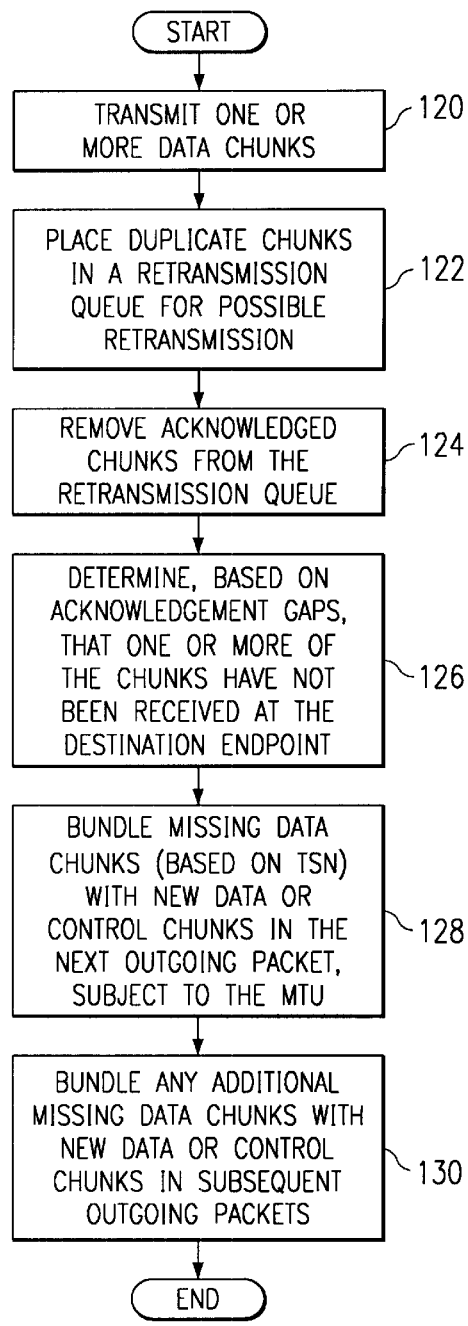

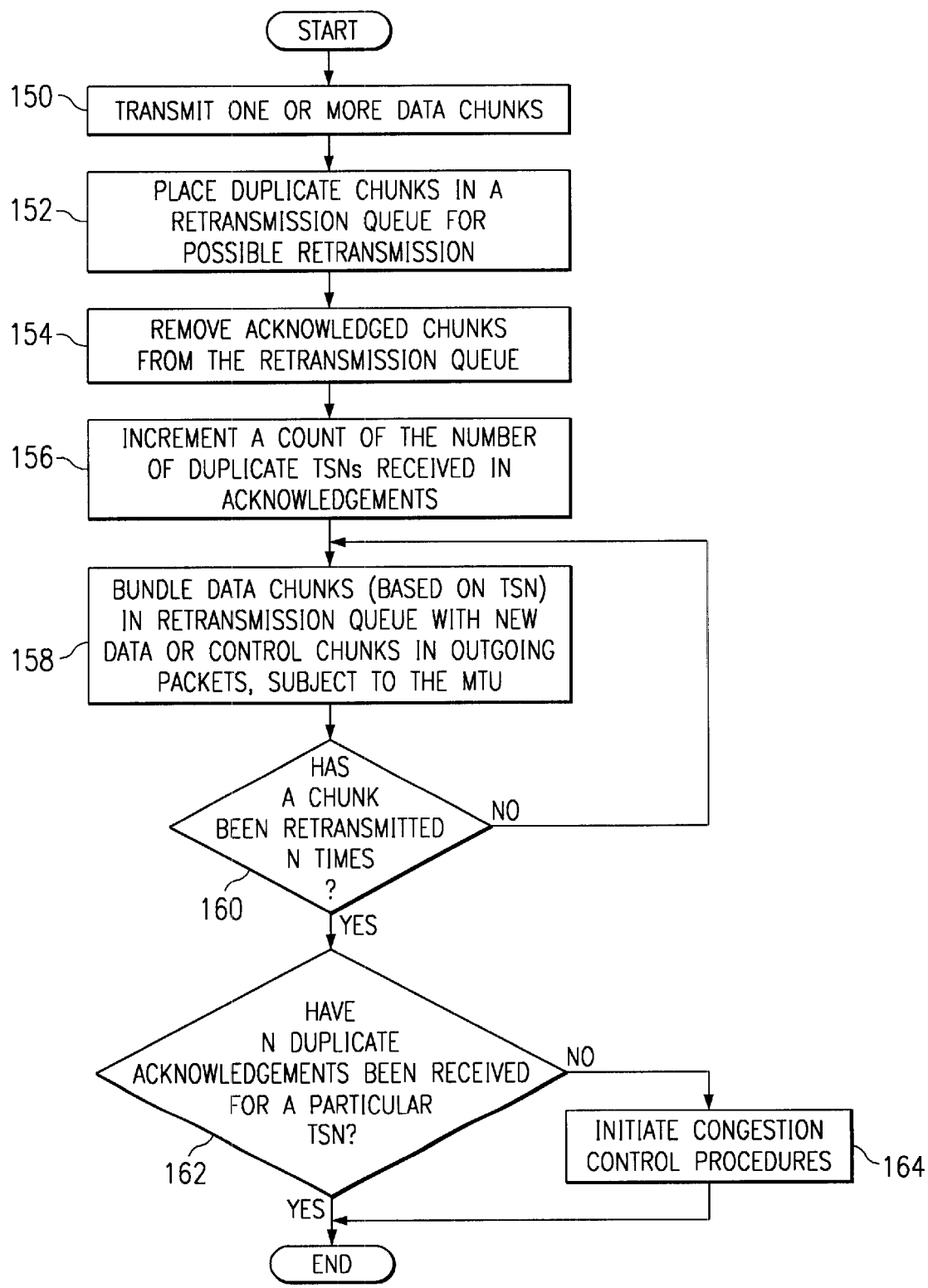

SYSTEM AND METHOD FOR PERIODIC RETRANSMISSION OF MESSAGES

BACKGROUND OF THE INVENTION

Modern telecommunications networks, such as the public switched telephone network (PSTN), depend on the fast and reliable exchange of control or signaling messages between various network nodes, such as telecommunication switches. Signaling System No. 7 (SS7) is primarily used in the PSTN to communicate such signaling using dedicated, out-of-band signaling channels. Out-of-band signaling is signaling that is not communicated over the same path as the data transfer (for example, a telephone conversation). Instead, a separate digital channel (a signaling link) is created so that signaling messages may be exchanged between network nodes.

Due to the ever-increasing growth of the Internet (and the resulting increase in its communication capacity), many experts have suggested that the Internet be used to communicate telecommunication signaling, such as SS7 signaling. In networks using the Internet Protocol (IP), such as the Internet, signaling messages are normally transported using the Transmission Control Protocol (TCP) or the User Datagram Protocol (UDP). However, neither UDP, TCP, nor any other communication protocols fulfills all the requirements of a high-performance telecommunications signaling system.

SUMMARY OF THE INVENTION

According to the present invention, disadvantages and problems associated with previous systems and methods for retransmitting messages have been substantially reduced or eliminated.

According to one embodiment of the present invention, a method for retransmission of messages includes transmitting a first message from a source to a destination using a packet-based network. The destination is capable of transmitting an acknowledgement to the source indicating the receipt of the first message. The method also includes determining that the first message has not been acknowledged and periodically retransmitting the first message from the source to the destination. In doing so, the first message is bundled in a packet with a second message that is being transmitted from the source for the first time. Therefore, an additional packet is not created for the retransmission of the first message.

The system and method of the present invention provide a number of important technical advantages. For example, embodiments of the present invention provide for the periodic retransmission of messages using the Stream Control Transmission Protocol (SCTP) or other appropriate communication protocols without an associated increase (or with a limited increase) in the number of packets that are transmitted over the associated network (as currently exists when using such protocols). Since each packet transmitted over a network has an associated overhead, no matter how much data the packet contains, a reduction in the number of packets communicated using the network helps to reduce congestion in the network.

This advantage may be accomplished, at least in part, through the modification of existing protocols or the creation of a new protocol that allows periodic bundling of messages to be retransmitted with new messages being sent from a source. This bundling is effective since packets sent from a source are often not full (do not equal the maximum packet size) and thus messages to be retransmitted may be added to the outgoing packets. This bundling technique is especially effective if the messages to be transmitted are relatively small (as is the case with PSTN signaling messages), since such small messages are more likely to fit into the unoccupied space in the outgoing packets. However, any other appropriate types of messages may also be retransmitted using embodiments of the present invention. Furthermore, the periodic bundling of messages to be retransmitted with new messages may be accomplished in cooperation with existing retransmission techniques used by SCTP and similar protocols (such as the retransmission of packets based on retransmission timers and acknowledgement gaps). Other important technical advantages are readily apparent to those skilled in the art from the following figures, descriptions and claims.

BRIEF DESCRIPTION OF THE DRAWINGS

To provide a more complete understanding of the present invention and the features and advantages thereof, reference is made to the following description taken in conjunction with the accompanying drawings, in which:

FIG. 4 illustrates an exemplary method of retransmitting data chunks based on the expiration of a retransmission timer;

FIG. 5 illustrates an exemplary method of retransmitting data chunks based on an acknowledgement gap;

FIG. 7 illustrates another exemplary method of periodically retransmitting data chunks.

DETAILED DESCRIPTION OF THE INVENTION

Figure 1:
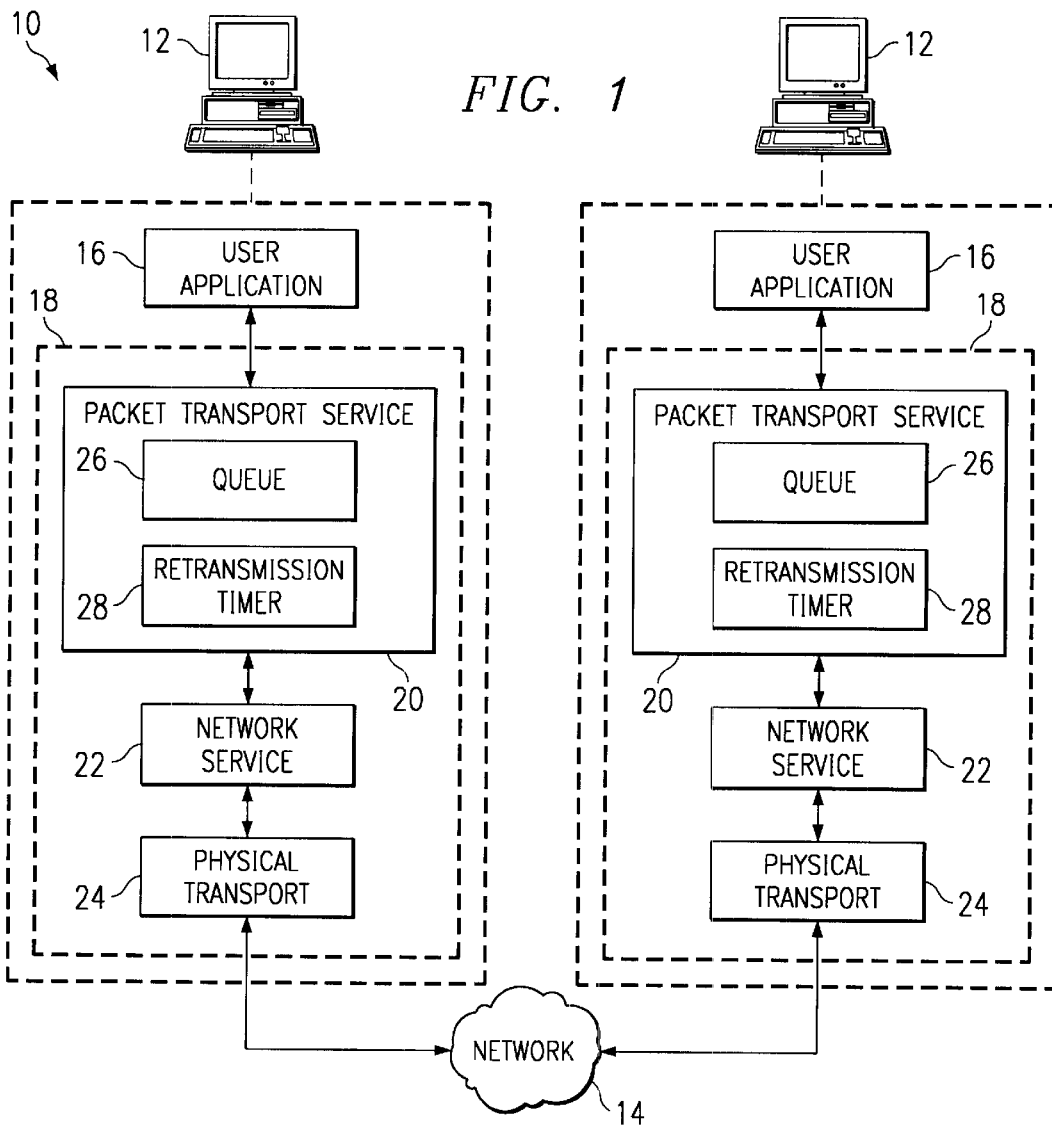
FIG. 1 illustrates an exemplary system for communicating data.

FIG. 1 illustrates an exemplary system 10 for communicating data. System 10 includes one or more computers 12 coupled to a packet-based network 14. Computers 12 include one or more user applications 16 that may communicate messages to one or more user applications 16 of another computer 12. Such messages may be communicated using a protocol stack 18 included in computers 12. Protocol stack 18 may include one or more of the various network "layers" that may used to communicate messages from one user application 16 to another. For example, protocol stack 18 may include a packet transport service 20, a network service 22, and a physical transport service 24. Protocol stack 18 may also include any other suitable components, and such components may function, if appropriate, as intermediate layers between user application 16, packet transport service 20, network service 22, and physical transport service 24. Furthermore, packet transport service 20 may include a queue 26 and one or more retransmission timers 28, described below.

In operation, a message from a user application 16 of a source computer 12 is communicated through the components of the associated protocol stack 18 to network 14. The message, which may be encapsulated in one or more packets or other data units by each component of protocol stack 18, is communicated to the protocol stack 18 of the destination computer 12 using network 14. The message is then communicated through the components of the destination protocol stack 18 to the destination user application 16.

User applications 16 and the components of protocol stacks 18 may be implemented as any suitable combination of hardware and/or software operating on one or more computers 12. In an exemplary embodiment, packet transport service 20 may be the Stream Control Transmission Protocol (SCTP) and network service 22 may be the Internet Protocol (IP). However, it should be understood that embodiments of the present invention may use any packet transport service 20 and network service 22 that provide suitable features for implementing the present invention. These features may include, but are not limited to, user message bundling and user message retransmission. For example, other appropriate protocols may include, but are not limited to, Q.2111 Annex C and H.323 Annex E. Furthermore, any appropriate physical transport service 24, such as Ethernet, Fiber-Distributed Data Interface (FDDI), or Asynchronous Transfer Mode (ATM), may be used.

SCTP is a packet transport service or protocol that operates at the same network layer as the Transmission Control Protocol (TCP) and the User Datagram Protocol (UDP) which currently provide transport layer functions for most Internet applications and for many other packet-based network applications. UDP is a connectionless protocol that provides fast and efficient communication of messages, making it suitable for transmission of signaling messages and other messages which are sensitive to delays. UDP does not, however, provide a reliable transport service. For example, UDP does not safeguard against transmission errors through detection of duplicated messages, repeat transmission of lost messages, sequence maintenance, or other similar functions.

TCP is a connection-oriented or stream-oriented protocol that does provide safeguarding against transmission errors. However, an application using TCP may be hindered by these safeguards. For example, TCP has strict sequence maintenance rules that are not required by many signaling applications (a signaling application may only require sequencing for signaling messages belonging to the same call). The strict sequence maintenance of TCP can unnecessarily create a blockage of received data packets associated with one call when packets associated with other calls are missing (for example, when the missing packets are interspersed is a sequence with the received packets). This blockage creates unnecessary delays in the delivery of the signaling messages.

As with TCP, SCTP provides a reliable packet transport service which helps to ensure that data is transported across a network, such as the Internet, in sequence and without error. Furthermore, SCTP, like TCP, is a connection-oriented protocol. Therefore, a relationship is created between the endpoints of an SCTP communication session prior to data being transmitted, and this relationship is maintained until the communication has successfully been completed.

Unlike TCP, SCTP also provides a number of functions that are often beneficial for signaling transport. These functions are provided with SCTP since SCTP was originally designed for communication of public switched telephone network (PSTN) signaling or other telecommunication signaling over IP networks. However, the generic design of SCTP can be used to provide a reliable transport delivery mechanism for any other user applications 16 requiring delivery of data using a packet-based network (including, but not limited to an IP network). SCTP provides several services to ensure the reliable delivery of data. These services include, but are not limited to, acknowledged, error-free transfer of user data, segmentation of user packets to conform to the maximum transmission unit (MTU) size for a particular communication path, sequenced delivery of user packets within a stream, bundling of multiple user messages into one SCTP packet to improve bandwidth utilization, and support for multiple transport addresses at either or both ends of a communication session to enhance reliability.

Since neither UDP nor TCP fulfill all the requirements of a high-performance, Internet-based telecommunications signaling system, SCTP has been proposed for transporting signaling and other messages over IP-based networks. However, SCTP was designed with the congestion control mechanisms of TCP built into it, including exponential back-off of retransmission timers. There was discussion during development of SCTP that it did not provide for a deterministic way of determining when a signaling message would be delivered to the destination in the face of packet loss. However, TCP-friendly congestion control was determined to be mandatory to reduce congestion. There is a tradeoff of minimizing traffic on the network and providing for timely retransmission. The present invention minimizes the number of packets on the network while providing for timely delivery of messages in the face of packet loss.

Figure 2:
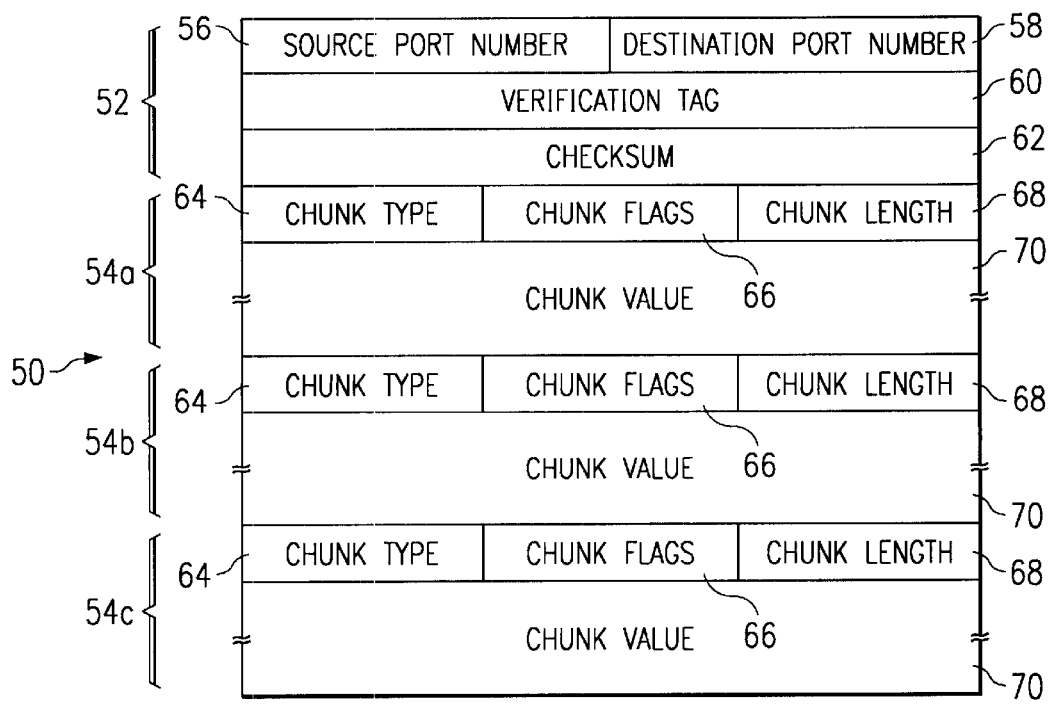
FIG. 2 illustrates an exemplary SCTP packet in which messages may be communicated between SCTP user applications.

FIG. 2 illustrates an exemplary SCTP packet 50 in which messages may be communicated between SCTP user applications 16. SCTP packet 50 includes a common header 52 and one or more chunks 54. Common header 52 includes a source port number 56 and a destination port number 58 to allow multiplexing of different SCTP associations at the same IP address, a verification tag 60 to validate the source of packet 50, and a checksum 62 used for end-to-end error detection. Each chunk 54 includes a chunk type field 64, a flag field 66, a chunk length field 68, and a chunk value 70. Each chunk 54 may include either user application data or SCTP control information. As is described below, the type and format of the data included as chunk value 70 depends on the chunk type.

As is illustrated in FIG. 2, SCTP provides for the bundling of multiple data and/or control chunks 54 in a single packet 50 to improve transport efficiency. SCTP is responsible for assembling the multiple chunks 54 in an SCTP packet 50 and for disassembling packet 50 into the various chunks 54 at the destination endpoint. The bundling of multiple chunks 54 in a packet 50 reduces congestion in network 14 by reducing the total number of packets 50 that have to be communicated (since each packet, regardless of its size, has an associated network overhead). However, the number of chunks 54 that may be bundled in a packet 50 is limited by the MTU of the communication path being used in network 14. The total size of an IP packet (or other similar packet), which includes SCTP packet 50 and any appropriate IP headers, should be less than or equal to the path MTU.

Figure 3:
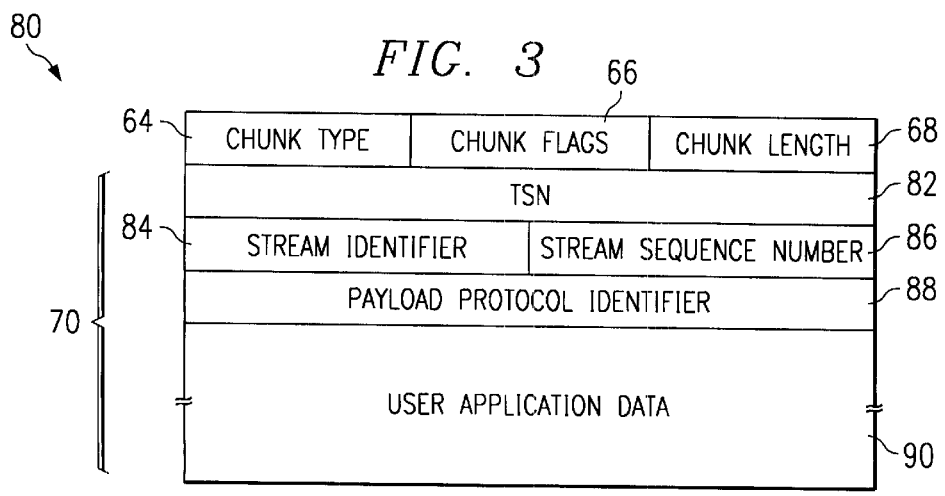
FIG. 3 illustrates an exemplary SCTP data chunk.

FIG. 3 illustrates an exemplary data chunk 80. As described above, data chunks 80 (like other types of chunks 54) include a chunk type field 64, chunk flags 66, and a chunk length field 68. Furthermore, the chunk value 70 of data chunk 80 includes various parameters that ensure efficient and error-free delivery of user application data 90 included in data chunk 80. These parameters include a transmission sequence number (TSN) 82 that is used by SCTP to permit the destination endpoint to acknowledge receipt of data chunk 80 and to identify duplicate data chunks 80 (as is described below, a data chunk 80 may be communicated to the destination endpoint multiple times until the destination endpoint acknowledges delivery of the data chunk 80). Data chunk 80 also includes a stream identifier 84 and a stream sequence number 86 that SCTP uses to assure sequenced delivery of user messages in a particular stream. A stream is a uni-directional logical channel established between two SCTP endpoints. Data chunk 80 may also include a payload protocol identifier 88 that is used by user applications 16 (or network layers between SCTP and a user application 16) to identify the type of user application data 90 included in data chunk 80.

Like TCP, SCTP uses a selective acknowledgement procedure to confirm the receipt of data chunks 80. Receipt of data chunks 80 is acknowledged by sending a selective acknowledgement (SACK) chunk, which indicates the cumulative transmission sequence number (TSN) range received and any non-cumulative TSNs (implying gaps in the received TSN sequence). A data chunk 80 may be retransmitted when the source endpoint receives four SACKs indicating that the data chunk 80 has not been received (based on a gap in the acknowledged TSNS) or when a retransmission timer 28 expires before a SACK associated with the data chunk 80 is received at the source endpoint. In a typical implementation, a SACK indicating a missing data chunk 80 is more likely to cause a retransmission than the expiration of retransmission timer 28.

When SCTP determines that one or more data chunks 80 need to be retransmitted, SCTP typically creates a new packet 50 that includes one or more data chunks 80 to be retransmitted (SCTP may bundle a retransmitted chunk 80 with one or more other retransmitted chunks 80). However, since a new packet 50 is created for the retransmission of data chunks 80, the retransmission process adds additional traffic to the network and increases congestion. Since there is a certain amount of overhead associated with each packet communicated over network 14, regardless of the size of the payload in each packet, increasing the number of packets increases the workload of routers and other devices in network 14 and may result in a reduction in the throughput of network 14. For example, the communication of two packets that are half the size of the MTU requires more network resources than the communication of a single packet that has a size equal to the MTU. Therefore, it is more efficient to send less packets with larger payloads than more packets with smaller payloads. Embodiments of the present invention take advantage of this efficiency by modifying SCTP or other appropriate communication protocols such that chunks 80 to be periodically retransmitted may be inserted into outgoing packets that were already going to be created for the transmission of new data or control chunks 54. Therefore, additional packets 50 do not need to be created for the periodic retransmission of data chunks 80.

FIG. 4 illustrates an exemplary method of retransmitting data chunks 80 based on the expiration of a retransmission timer 28. Again, although this exemplary method (as well as the methods described below) includes the use of a modified SCTP as the packet transport service 20, it should be understood that any other appropriate modified packet transport service 20 may be used. Furthermore, it should also be understood that although the following methods are presented as a sequence of steps, it should be understood that the steps may occur simultaneously or in a different order with respect to the transmission and retransmission of different chunks. The exemplary method begins at a step 100 at which a source endpoint, which may include a computer 12 or any other device in network 14, transmits one or more data chunks 80 to a destination endpoint. Each transmitted data chunk 80 (or a representation of each transmitted chunk 80) is placed in queue 26 at step 102 for possible retransmission. It should be understood, that "placing" a chunk 80 in queue in any of the described methods may include placing chunk 80 in a retransmission queue 26 that is separate from a queue including chunks 80 being sent for the first time, retaining transmitted chunks 80 in a single queue 26 and flagging the chunks 80 for retransmission, or any other appropriate queuing technique. At step 104, data chunks 80 are removed from queue 26 when the source endpoint receives a SACK or other acknowledgement that a data chunk 80 has been received at the destination endpoint.

The source endpoint determines at step 106 that a retransmission timer 28 associated with one or more data chunks 80 (that have not been removed from queue 26) has expired. At step 108, in response to this expiration, the source endpoint bundles one or more of data chunks 80 to be retransmitted ("unacknowledged data chunks") with one or more new data or control chunks 54 that are currently being transmitted from the source endpoint in an outgoing packet 50 (assuming that the addition of an unacknowledged data chunk 80 does not cause the MTU to be exceeded). Unacknowledged data chunks 80 may be bundled into outgoing packets based on the TSN of chunks 80, with chunks 80 having the lowest TSN being bundled first. Furthermore, unacknowledged data chunks 80 may be bundled with the new data or control chunks 54 until the addition of another unacknowledged data chunk 80 would cause the MTU to be exceeded. If there are remaining unacknowledged data chunks 80 to be retransmitted after packet 50 is filled, the remaining unacknowledged data chunks 80 may be bundled with subsequent outgoing data or control chunks 54 in one or more subsequent packets 50 at step 110.

The exemplary method may be repeated each time that a data chunk 80 is to be retransmitted based on the expiration of retransmission timer 28. The use of the exemplary method helps to reduce congestion in network 14 by reducing the total number of packets 50 that are transmitted from a source endpoint. Since the data chunks 80 being retransmitted are included in packets 50 that were already going to be transmitted from the source endpoint (but which were not full), no additional packets 50 need to be created for the retransmission of data chunks 80. The exemplary method may be used to retransmit data chunks 80 containing an type of data. However, the method is especially advantageous when the data chunks 80 to be retransmitted are small in comparison to the MTU (such as with PSTN signaling messages), since it is more likely that one or more small data chunks 80 may fit into packets 50 with the new data or control chunks 54 that the source endpoint is already transmitting.

FIG. 5 illustrates an exemplary method of retransmitting data chunks 80 packets based on acknowledgement gaps. The method begins at step 120 at which a source endpoint transmits one or more data chunks 80 to a destination endpoint. Each transmitted data chunk 80 (or a representation of each transmitted chunk 80) is placed in queue 26 at step 122 for possible retransmission. At step 124, data chunks 80 are removed from queue 26 when the source endpoint receives a SACK or other acknowledgement that a data chunk 80 has been received at the destination endpoint. However, as described above, the source endpoint may receive one or more SACKs including a sequence of TSNs that is missing one or more TSNs (thus indicating that the destination endpoint has not received the data chunks 80 associated with the missing TSNs). These gaps in the acknowledgements received at the source endpoint may be referred to as acknowledgement gaps.

Based on these gaps, the source endpoint determines at step 126 that the data chunks 80 corresponding to the missing TSNs have not been received at the destination endpoint. At step 128, in response to the missing TSNs, the source endpoint bundles one or more of data chunks 80 associated with the missing TSNs ("unknowledged data chunks") with one or more new data or control chunks 54 that are currently being transmitted from the source endpoint in an outgoing packet 50 (assuming that the addition of an unacknowledged data chunk 80 does not cause the MTU to be exceeded). As described above, unacknowledged data chunks 80 may be bundled into outgoing packets based on the TSN of chunks 80, with chunks 80 having the lowest TSN being bundled first. Furthermore, unacknowledged data chunks 80 may be bundled with the new data or control chunks 54 until the addition of another unacknowledged data chunk 80 would cause the MTU to be exceeded.

If there are remaining data chunks 80 to be retransmitted after packet 50 is filled, the remaining unacknowledged data chunks 80 may be bundled with subsequent outgoing data or control chunks 54 in one or more subsequent packets 50 at step 130. The exemplary method may be repeated each time that a data chunk 80 is to be retransmitted based on an acknowledgement gap. As with the exemplary method described in conjunction with FIG. 4, this exemplary method helps to reduce congestion in network 14 by reducing the total number of packets 50 that are transmitted from a source endpoint. Furthermore, the methods of FIGS. 4 and 5 may be combined so that chunks 80 are retransmitted based on both the expiration of a retransmission timer 28 and when there is an acknowledgement gap.

Figure 6:
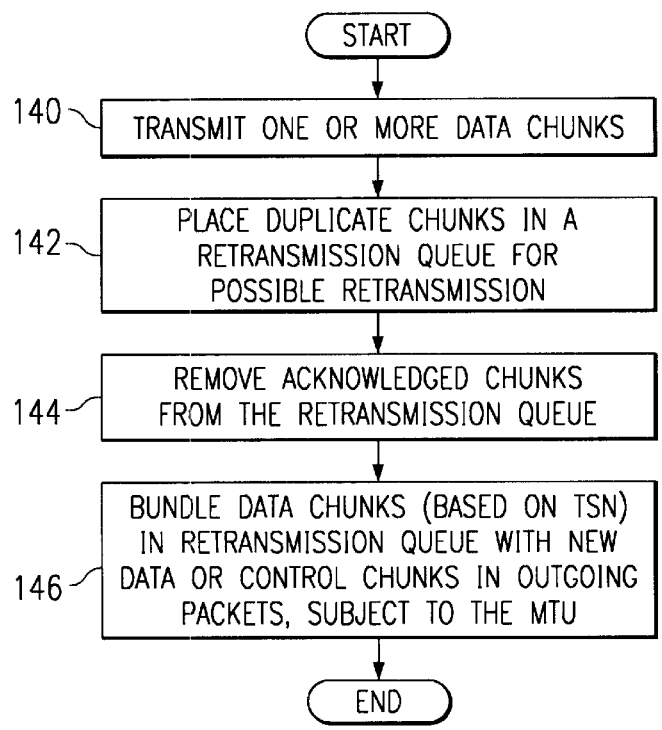
FIG. 6 illustrates an exemplary method of periodically retransmitting data chunks.

FIG. 6 illustrates an exemplary method of periodically retransmitting data chunks 80. The method begins at step 140 at which a source endpoint transmits one or more data chunks 80 to a destination endpoint. Each transmitted data chunk 80 (or a representation of each transmitted chunk) is placed in queue 26 at step 142 for possible retransmission. At step 144, a data chunk 80 is removed from queue 26 when the source endpoint receives an acknowledgement (such as a SACK) that a data chunk 80 has been received at the destination endpoint. At step 146, the source endpoint retransmits data chunks 80 that have not been acknowledged and removed from queue 26 at step 144. Unlike the exemplary methods described above, this retransmission may not be based on the expiration of retransmission timer 28 or an acknowledgement gap. Instead, unacknowledged data chunks 80 are automatically retransmitted whenever there is space in an outgoing packet 50. This retransmission may occur even though a retransmission timer 28 associated with a data chunk 80 has not expired and even though a data chunk 80 has not been deemed to be missing due to an acknowledgement gap.

The order in which data chunks 80 are retransmitted at step 146 may be based on the TSN of each chunk 80. For example, chunks 80 having the lowest TSNs may be retransmitted first. In addition, the source endpoint may continue to retransmit data chunks 80 in a periodic manner until an acknowledgement is received. The source endpoint may wait a selected period of time before again retransmitting a data chunk, so that other data chunks 80 may also be retransmitted (if there was no "waiting period" then the same data chunk 80 may be continuously retransmitted with each outgoing packet 50). This waiting period specifies a "retransmission rate," and any appropriate retransmission rate may be used. The waiting period may be ignored (and the associated data chunk 80 retransmitted) if a retransmission timer 28 associated with the data chunk 80 expires or if the source endpoint receives an acknowledgement gap associated with the data chunk 80.

Alternatively or in addition, the source endpoint may periodically retransmit data chunks 80 a fixed number of times, N. The source endpoint may bundle the retransmitted chunks 80 first in an outgoing packet 50 in ascending order of TSN value up to the path MTU size. A chunk 80 may by retransmitted continuously in consecutive packets 50 or in another appropriate periodic manner until the chunk 80 has been retransmitted N times. If the application requires timeliness of delivery over possible congestion in the network, the source can bundle multiple retransmitted data chunks 80 into a packet 50 without waiting for a new data chunk to be transmitted. The number of times to retransmit a data chunk 80 and whether or not packets 50 with no new data chunks 80 are transmitted can be varied based on the needs of the network and application.

Furthermore, it should be understood (as with the methods described above) that the steps of the exemplary method may occur simultaneously or in a different order with respect to the transmission and retransmission of different chunks. For example, although step 144 is illustrated as occurring before step 146, one or more data chunks may be retransmitted before any SACKs are received. Furthermore, the method may be repeated as the source endpoint transmits additional data chunks 80.

FIG. 7 illustrates another exemplary method of periodically retransmitting data chunks 80. One problem that may occur with the periodic retransmission method described in conjunction with FIG. 6 is that the destination may often not detect a lost data chunk 80. If a packet 50 is lost due to errors or congestion, the destination will often receive the missing data chunks 80 in the next packet 50 or a subsequent packet 50 transmitted by the source endpoint. Therefore, acknowledgement gaps and retransmission timeouts may seldom occur. These mechanisms are the only techniques defined in TCP and SCTP for determining that a packet 50 was lost. If a packet 50 is not determined to be lost, then congestion control mechanisms, such as TCP congestion control mechanisms my not be initiated. However, if a protocol supports a method for the destination to notify the source of the receipt of duplicate data chunks 80 in the acknowledgement (as does a SACK in SCTP), the source endpoint can determine if a packet is lost and implement TCP-friendly congestion control mechanisms or other appropriate congestion control mechanisms.

The method of FIG. 7 begins at step 150 at which a source endpoint transmits one or more data chunks 80 to a destination endpoint. Each transmitted data chunk is placed in queue 26 at step 152 for retransmission. At step 154, data chunks 80 are removed from queue 26 when the source endpoint receives an acknowledgement that a data chunk 80 has been received at the destination endpoint. At step 156, the source endpoint increments a count of the number of duplicate TSNs received in received SACKs (the number of times a particular chunk 80 has been acknowledged by the destination endpoint). At step 158, the source endpoint bundles retransmitted data chunks 80 that have not been acknowledged and removed from queue 26 at step 144 with new data chunks. Under this method, a data chunk 80 may be retransmitted a maximum of N times. Therefore, at step 160, the source endpoint determines whether a particular retransmitted chunk 80 has been retransmitted N times (continuously in consecutive packets 50 or in another appropriate periodic manner). If not, the method returns to step 158. If so, the source endpoint determines whether N duplicative acknowledgements have been received for a particular TSN (whether a particular chunk 80 has been acknowledged by the destination endpoint N times) at step 162. If so, the source endpoint determines that the chunk 80 is not lost and the method ends. If the source does not receive N duplicate acknowledgements for the particular TSN, then the source considers it an indication that a chunk 80 and the associated packet 50 are lost and the source endpoint initiates appropriate congestion control procedures at step 164. For example, the source endpoint may initiate TCP congestion control procedures as described in Request For Comments (RFC) 2581. This method allows the source endpoint to detect lost packets so it knows to begin congestion control.

It should be noted that the source endpoint may receive an acknowledgement from the destination before the source has retransmitted a chunk 80 N times. In this case, the source endpoint may not keep transmitting the chunk 80 until it reaches N. Instead, when the source endpoint receives a SACK acknowledging the chunk 80 before the source retransmits the data chunk N times, the source may stop retransmitting and compare (at step 162) the number of duplicate acknowledgements it receives with the number of times it actually sent the data chunk (which should be less than or equal to N). It should also be understood (as with the other methods described above) that the steps of the exemplary method may occur simultaneously or in a different order with respect to the transmission and retransmission of different chunks. For example, although step 154 is illustrated as occurring before step 156, one or more data chunks may be (and typically are) retransmitted before any SACKs are received. Furthermore, the method may be repeated as the source endpoint transmits additional data chunks 80.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for retransmission of messages, comprising:
    transmitting a plurality of messages from a source to a destination using a packet-based network and a communication protocol, the destination operable to transmit an acknowledgement to the source indicating the receipt of the messages;
    placing messages that have been transmitted in a queue for possible bundling and retransmission;
    removing a message from the queue upon receipt of an acknowledgement associated with that message from the destination; and
    periodically retransmitting selected messages in the queue from the source to the destination before the expiration of a retransmission timer established by the communication protocol, wherein one or more of the messages to be retransmitted may be bundled in a packet with another message being transmitted from the source for the first time such that an additional packet is not created for the retransmission of the retransmitted messages.

2. The method of claim 1, further comprising bundling one or more messages to be retransmitted in a packet with one or more messages being transmitted for the first time until the addition of another message to be retransmitted would cause the maximum transmission unit (MTU) of the network to be exceeded.

3. The method of claim 1, wherein periodically retransmitting a message in the queue comprises bundling and retransmitting the message at a selected rate of retransmission greater than a retransmission rate of a retransmission timer associated with the message.

4. The method of claim 1, wherein periodically retransmitting a message in the queue comprises bundling and retransmitting the first message continuously until the message is removed from the queue.

5. The method of claim 1, wherein periodically retransmitting a message in the queue comprises bundling and retransmitting the message continuously until the source determines that the message has been retransmitted a selected number of times.

6. The method of claim 5, further comprising:
    determining the number of duplicate acknowledgements received at the source from the destination that are associated with the message; and
    in response to determining that the number of duplicate acknowledgements is less than the selected number of times the message was retransmitted, initiating a congestion control procedure after the message has been retransmitted the selected number of times.

7. The method of claim 1, wherein a plurality of unacknowledged messages are bundled and retransmitted with one or more messages being transmitted for the first time, the unacknowledged messages retransmitted in order according to a transmission sequence number (TSN) associated with each message, the unacknowledged message having the lowest TSN being bundled and retransmitted first.

8. The method of claim 1, wherein the messages are transmitted using the Stream Control Transmission Protocol (SCTP).

9. The method of claim 1, wherein the packet-based network comprises the Internet.

10. A system for retransmission of messages, comprising a source device coupled to a packet-based network and operable to:
    transmit a plurality of messages to a destination device using the packet-based network and a communication protocol, the destination device coupled to the packet-based network and operable to receive the messages and transmit an acknowledgement to the source device indicating the receipt of the messages;
    place transmitted messages in a queue for possible bundling and retransmission;
    remove a message from the queue upon receipt of an acknowledgement associated with that message from the destination device; and
    periodically retransmit selected messages in the queue to the destination device before the expiration of a retransmission timer associated with the communication protocol, the source device operable to bundle the messages to be retransmitted in a packet with another message being transmitted from the source device for the first time such that an additional packet is not created for the retransmission of the retransmitted messages.

11. The system of claim 10, wherein the source device is further operable to bundle messages to be retransmitted in a packet with one or more messages being transmitted for the first time until the addition of another message to be retransmitted would cause the maximum transmission unit (MTU) of the network to be exceeded.

12. The system of claim 10, wherein the source device is operable to bundle and retransmit a message in the queue at a selected rate of retransmission greater than a retransmission rate of a retransmission timer associated with the message.

13. The system of claim 10, wherein the source device is operable to periodically retransmit a message in the queue by continuously bundling and retransmitting the message until the message is removed from the queue.

14. The system of claim 10, wherein the source device is operable to periodically retransmit a message in the queue by continuously bundling and retransmitting the message until the source determines that the message has been retransmitted a selected number of times.

15. The system of claim 14, wherein the source device is further operable to:

determine the number of duplicate acknowledgements received from the destination device that are associated with the message; and in response to determining that the number of duplicate acknowledgements is less than the selected number of times the message was retransmitted, initiate a congestion control procedure after the message has been retransmitted the selected number of times.

16. The system of claim 10, wherein the source device is operable to a bundle and retransmit a plurality of unacknowledged messages with one or more messages being transmitted for the first time, the unacknowledged messages retransmitted in order according to a transmission sequence number (TSN) associated with each message, the unacknowledged message having the lowest TSN being bundled and retransmitted first.

17. The system of claim 10, wherein the source device transmits messages using the Stream Control Transmission Protocol (SCTP).

18. The system of claim 10, wherein the packet-based network comprises the Internet.

19. Communication software embodied in a computer-readable medium and operable to;

transmit a plurality of messages from a source to a destination using a packet-based network and a communication protocol, the destination operable to transmit an acknowledgement to the source indicating the receipt of the messages;

place messages that have been transmitted in a queue for possible bundling and retransmission;

remove a message from the queue upon receipt of an acknowledgement associated with that message from the destination; and periodically retransmit selected messages in the queue from the source to the destination before the expiration of a retransmission timer established by the communication protocol, wherein one or more of the messages to be retransmitted may be bundled in a packet with another message being transmitted from the source for the first time such that an additional packet is not created for the retransmission of the retransmitted messages.

20. The software of claim 17, further operable to bundle one or more messages to be retransmitted in a packet with one or more messages being transmitted for the first time until the addition of another message to be retransmitted would cause the maximum transmission unit (MTU) of the network to be exceeded.

21. The software of claim 17, wherein periodically retransmitting a message in the queue comprises bundling and retransmitting the message at a selected rate of retransmission retransmission greater than a retransmission rate of a retransmission timer associated with the message.

22. The software of claim 19, wherein periodically retransmitting a message in the queue comprises bundling and retransmitting the message continuously until the message is removed from the queue.

23. The software of claim 19, wherein periodically retransmitting a message in the queue comprises bundling and retransmitting the message continuously until the source determines that the message has been retransmitted a selected number of times.

24. The software of claim 23, further operable to:

determine the number of duplicate acknowledgements received at the source from the destination that are associated with the message; and in response to determining that the number of duplicate acknowledgements is less than the selected number of times the message was retransmitted, initiate a congestion control procedure after the message has been retransmitted the selected number of times.

25. The software of claim 19, further operable to bundle and retransmit a plurality of unacknowledged messages with one or more messages being transmitted for the first time, the unacknowledged messages retransmitted in order according to a transmission sequence number (TSN) associated with each message, the unacknowledged message having the lowest TSN being bundled and retransmitted first.

26. The software of claim 19, wherein messages are transmitted using the Stream Control Transmission Protocol (SCTP).

27. The software of claim 19, wherein the packet-based network comprises the Internet.

28. A system for retransmission of messages, comprising:

means for transmitting a plurality of messages from a source to a destination using a packet-based network and a communication protocol, the destination operable to transmit an acknowledgement to the source indicating the receipt of the messages;

means for queuing messages that have been transmitted for possible bundling and retransmission;

means for removing a message from the queue upon receipt of an acknowledgement associated with that message from the destination; and means for periodically retransmitting selected messages in the queue from the source to the destination before the expiration of a retransmission timer established by the communication protocol, wherein one or more of the messages to be retransmitted may be bundled in a packet with another message being transmitted from the source for the first time such that an additional packet is not created for the retransmission of the retransmitted messages.

* * * * *

UNITED STATES PATENT AND TRADEMARK OFFICE
CERTIFICATE OF CORRECTION

PATENT NO. : 6,694,471 B1
DATED : February 17, 2004
INVENTOR(S) : Hascall H. Sharp It is certified that error appears in the above-identified patent and that said Letters Patent is hereby corrected as shown below:

Column 10,
Line 6, after "retransmitting the" delete "first".

Column 11,
Line 29, after "transmits" insert -- the --.
Line 55, after "claim" delete "17" and insert -- 19 --.

Column 12,
Line 1, after "claim" delete "17" and insert -- 19 --.
Line 33, after "wherein" insert -- the --.

Signed and Sealed this

Seventeenth Day of August, 2004

JON W. DUDAS
*Acting Director of the United States Patent and Trademark Office*